March 14, 1967  R. H. BOLL  3,309,546
APPARATUS FOR THE GENERATION OF ELECTRIC ENERGY
Filed March 14, 1963  6 Sheets-Sheet 1

FIG. 1

INVENTOR.
Richard H. Boll
BY

ATTORNEY

March 14, 1967  R. H. BOLL  3,309,546
APPARATUS FOR THE GENERATION OF ELECTRIC ENERGY
Filed March 14, 1963  6 Sheets-Sheet 4

FIG. 4

March 14, 1967 R. H. BOLL 3,309,546
APPARATUS FOR THE GENERATION OF ELECTRIC ENERGY
Filed March 14, 1963 6 Sheets-Sheet 5

March 14, 1967      R. H. BOLL      3,309,546
APPARATUS FOR THE GENERATION OF ELECTRIC ENERGY
Filed March 14, 1963      6 Sheets-Sheet 6

3,309,546
APPARATUS FOR THE GENERATION OF ELECTRIC ENERGY
Richard H. Boll, Alliance, Ohio, assignor to The Babcock & Wilcox Company, New York, N.Y., a corporation of New Jersey
Filed Mar. 14, 1963, Ser. No. 265,248
7 Claims. (Cl. 310—11)

The present invention relates to apparatus for the direct conversion of thermal energy into electrical energy, and more particularly to apparatus for the generation of electric power through the interaction of a flowing, partially ionized gas with a magnetic field. (It has become commonplace to call such generators magnetohydrodynamic, or MHD generators; however, the term magnetogasdynamic, or MGD, is more accurate in the present case, and will be used throughout this specification.)

The term "MGD generator" will be used herein to designate a generator comprising a combination of a plenum chamber for receiving high pressure electrically conducting gas, a nozzle communicating with the plenum chamber for accelerating the gas to an appropriate velocity, a flow channel communicating with the nozzle and fitted with electrodes for receiving gas flow from the nozzle, the electrodes being for the purpose of receiving electric current generated by the gas, a diffuser section communicating with the exit end of the flow channel for recovering velocity energy from the spent gas, and field coils means for producing a magnetic field within the flow channel transverse to the flow of gas. It will, of course, also be understood that the production of electric power from such a generator requires the further provision of means for connecting the electrodes to an external load and means for energizing the field coils. The term "inter-electrode zone" as used herein will denote the aforementioned flow channel, in order to distinguish this flow channel from other flow channels associated with the generator. The term "insulating gap" as used herein will be taken to mean means for providing an electrically insulating band in or on the wall of a particular part of the generator, or between parts of the generator.

As is well known, when an electrical conductor is moved through a magnetic field, there is generated within the conductor an electromotive force whose direction is perpendicular to both the flow vector and the magnetic field vector. This general law applies whether the conductor is a copper wire or a partially ionized, and therefore electrically conducting, gas. Generators using the MGD principle, i.e., the flow of a partially ionized gas through a magnetic field, have been proposed from time to time since about 1910. (See, for example: Meszlang, German Patent #245,672 (1910); Rudenberg, U.S. Patent #1,717,413 (1929); Rupp, U.S. Patent #1,916,076 (1933).) However, none of these early generators has achieved any real success in the practical generation of electric power, probably because of the difficulty of achieving adequate gas conductivity. Recently, on the other hand, it has been learned that adequate gas conductivity can be achieved in combustion gases in the temperature range upwards from about 3500° F. through use of inexpensive seeding materials, which are notably compounds of potassium or cesium, and power generation has been demonstrated. (See, for example: R. J. Rosa, "Experimental Magnetohydrodynamic Power Generation," Journal of Applied Physics, volume 31, pages 735–736, April 1960.)

As pointed out by Sporn and Kantrowitz ("Magnetohydrodynamics—Future Power Source?" Power, vol. 103, pages 62–65, November 1959), if a practical MGD generator were combined with a conventional steam cycle, the result would be a power process of substantially improved efficiency. For example, whereas the most efficient of today's conventional plants achieve a net station heat rate in the vicinity of 8500 B.t.u./kwh., such a combined process should achieve a net station heat rate in the vicinity of 6500 B.t.u./kwh. So substantial a reduction in heat rate would mean enormous savings in fuel costs for electric utilities.

However, solution of the gas-conductivity problem does not immediately make MGD power generation practical, for several acute problems remain in the construction of the generator. For example, if the generator is constructed and operated as suggested by Sporn and Kantrowitz (supra) (see also: S. Way, "Magnetohydrodynamic Generators," Mechanical World, November 1960, pages 480–482) then the electrodes will be exposed to combustion gas resulting from the burning of fossil fuels. By the very nature of their function, the electrodes must be made of metallic or semi-metallic material, e.g., tungsten, tantalum, graphite, etc.; but it is also the nature of such materials to oxidize, especially at high temperatures when in contact with the proper oxidant. Combustion gas, even if the ratio of oxygen to fuel is substantially less than that required stoichiometrically, is such an oxidant. This means that either: (a) the electrodes must be operated with a high surface temperature and allowed to burn away at a rate quite probably uneconomic for large scale generation, or (b) the electrodes must be operated with a surface temperature substantially below the gas temperature. The second course, (b), will encounter a serious problem due to condensation or deposition of ash or ash constituents from the combustion gas.

Another, and perhaps even more serious, difficulty with generators having a rectangular inter-electrode zone with electrodes mounted on opposite sides, as suggested by Sporn and Kantrowitz and by others, is to be found in the side walls that are perpendicular to the electrodes; these simultaneously contain the combustion gas while electrically insulating the electrodes. At first sight, one might think that these walls could be made of an oxide which would neither melt nor burn at the gas temperatures contemplated in the MGD generator, and some workers have attempted this construction in experimental generators. However, most, if not all, oxides tend to become electrically conducting in the temperature range contemplated (3500° F. to 5500° F.). This means that the refractory oxide walls must be cooled so as to maintain their temperatures below their conducting temperature, which will generally be below the condensing temperature of ash constituents in the combustion gas. However, if the insulating walls are so cooled, then they too will tend to condense or collect ash or ash constituents from the combustion gas. The latter will at least flux the refractory oxide so as to cause its deterioration in a very short time, and at worst they will form a molten layer of ash connecting the electrodes. Since molten ash, or slag, is electrically conducting, cooled side walls will lead to "slag shorting" of the electrodes.

Of course, these problems of electrode and side-wall construction might be solved by discovering new materials. For example, the electrode problem might be solved by a material having both high electrical conductivity and good resistance to oxidation at temperatures in excess of roughly 4000° F.; the side-wall problem might be solved by a material having low electrical conductivity, low thermal conductivity, and high resistance to the onslaughts of combustion gas at temperatures above 4000°–4500° F. Then too, both materials would also have to possess several additional characteristics namely: reasonable cost, ability to be fabricated in various shapes, structural strength, resistance to thermal shock, etc. Insofar as is known discovery of a material or materials possessing these attributes is not imminent.

Another way of solving these problems would be to operate the MGD generator on an inert gas such as helium, thereby eliminating the oxygen and the ash from which both problems largely originate. But this solution encounters the difficulty of heating helium to temperatures at least in excess of 3000° F.—a problem which itself requires discovery of new materials, especially where fossil fuels are concerned.

From the foregoing, it seems obivous that the side-wall and electrode problems of MGD generators are not likely soon to be solved by discovery of new materials, especially where fossil fuels are concerned.

It is the general object of the present invention to minimize problems of side-wall and electrode construction in an MGD generator by using presently available materials together with novel constructions and methods of operation. More specifically, one object of the present invention is to minimize the side-wall problem by minimizing the extent of walls other than electrodes in comparison with the extent of the electrodes; this is done by making the inter-electrode zone an annulus formed between concentric frusto-conical electrodes, the flow of working fluid (gas) being substantially axial and the magnetic flux lines substantially circular. Although intended primarily for use with combustion gas from ash-containing fuels, wherein a layer of electrically conducting molten slag will usually cover all interior walls of the MGD generator, this construction will also be advantageous for a variety of reasons where other MGD working fluids are concerned.

A second object of the present invention is to overcome the electrode problem by protecting presently available electrode materials with a thin layer of electrically conducting molten or semi-molten slag. This is done, while avoiding formation of a non-conducting layer of solidified slag, by carefully controlling the surface temperature of the electrode. Thus the molten slag layer is continually replenished by condensed or deposited products from vaporous or molten ash or ash constituents in the MGD working fluid; these will usually occur naturally in combination gas from coal or residual fuel oil, and they can be added to other working fluids. This electrode construction and method of operation will improve the service life of the annular generator and also of any other MGD generator which utilizes an oxidizing gas as its working fluid.

A third object of the present invention is to provide practical constructions and methods of operating insulating gaps for electrically isolating various parts, especially electrodes, in an MGD generator. This is done by injecting air, or other nonconducting fluid, into the interior of the generator through a nozzle, or slot, in the generator wall. Thus, the molten slag layer is interrupted, and a layer of nonconducting fluid persists along the generator wall for some distance downstream of the nozzle or slot. In a modified insulating gap, I withdraw most of the previously injected air somewhat downstream of the injection point through a similar nozzle or slot. This serves to eliminate blanketing of the downstream wall of the generator by excess nonconducting fluid, and to minimize dilution of the MGD working fluid. Advantages of the modified gap include ability to be used immediately upstream of an electrode and suitability for multiple installation without undue dilution of the working fluid. These insulating gaps will improve the operation of my annular MGD generator and also improve the operation of other MGD generators requiring insulation between parts or between the generator walls and the working fluid.

A fourth object of the present invention is to combine more-or-less conventional constructions and methods of operation of the remaining essential components so as to produce a practical design concept encompassing an entire MGD generator. For example, all generator walls other than the electrodes are made of fluid-cooled surfaces operated so as to be protected from the working fluid by an electrically insulating layer of frozen slag. The required magnetic field is produced by toroidal field-coil windings of an electrical conductor, the windings being specially gathered at the ends of the generator so as to permit gas or air flow between them into the region of circular field that exists within the toroid.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

In describing the preferred embodiment of the invention illustrated in the drawings, specific terminology will be resorted to for the sake of clarity. However, the invention is not intended to be limited to the specific terms so selected, and it is to be understood that each specific term so selected includes all technical equivalents which operate in a similar manner to accomplish a similar purpose.

Figure 1:
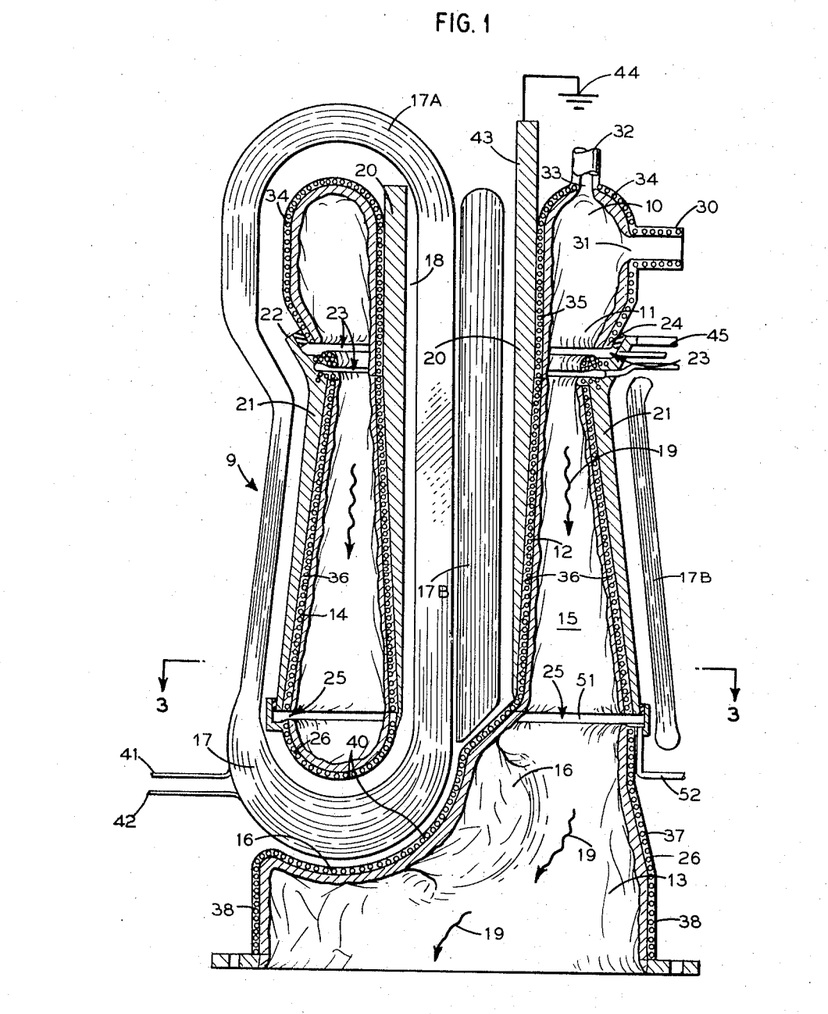
FIG. 1 is a sectional elevation of an MGD generator taken on line 1—1 of FIG. 2 constructed in accordance with the present invention.

As shown in FIG. 1, the plenum chamber 10, nozzle 11, center electrode 12, and diffuser 13 of the MGD generator 9 are coaxial with their common axis vertically disposed. The annular nozzle 11 communicates with the toroidal plenum chamber 10 which is above it. The annular nozzle also communicates with and discharges into the interelectrode space or zone 15 formed between frusto-conical center electrode 12 and outer electrode 14 which forms the gas-flow passage of the working fluid. The inter-electrode zone 15 communicates with the diffuser 13 below it, the flow of the gas making the transition from annular shape characteristic of the inter-electrode zone 15 to cylindrical shape following the diffuser. Hollow struts 16 communicating with an attached to the generator 9 and communicating with and attached to the hollow center electrode 12 are located within the diffuser section. Thus, the gas-flow path in the diffuser section 13 is around and between these struts. Field-coil windings 17 pass through the struts 16, around the outside of the outer electrode 14, past the nozzle section 11, around the plenum chamber 10, and through a hollow core 18 within the electrode 12 of the generator back to the struts. Current flow in these toroidal field-coil windings 17 produces a circular magnetic field within the inter-electrode zone 15. The wall 20 enclosing the core 18 provides structure to augment the mechanical strength of the center electrode, and is trifurcated at its upper end so as to pass between loops of the field coil windings 17. A similar support 21 is provided for the outer electrode 14. The upper end of the outer electrode support 21 forms a part of the outer wall 22 of the annular nozzle 11. An insulating gap 23 is installed in the upper part of the outer electrode support 21, so as to insulate the outer electrode support 21 and the outer electrode 14 from the wall 24 of the nozzle 11. An insulating gap 25 is provided between the outer electrode support 21 and the outer wall 26 of the diffuser 13.

In this particular embodiment of the invention, the toroidal plenum chamber 10 is considered to be identical with a toroidal combustion chamber. It will be understood that the chamber 10 could equally well be only a plenum chamber with hot pressurized gas being supplied through pipes from an external combustor or combustors, or a nuclear reactor. However, where the generator working fluid is to be combustion gas, it will generally be advantageous to incorporate the combustion chamber within the plenum chamber 10. As shown in FIGURE 1, pressurized and preheated air or oxygen, or a mixture thereof, is supplied to the annular combustion or plenum chamber 10 through pipes 30 and ports 31. Pressurized fuel and seeding material are supplied to the toroidal combustion chamber 10 through pipes 32 and ports 33.

The walls of the combustion chamber 10 may be formed of water cooled surfaces in a manner similar to conventional boiler-furnace practice As shown, these walls are built up of coils of stainless steel tubing 34 joined together so as to form a pressure-tight enclosure. It will readily be appreciated that the walls of the combustion chamber could be fashioned in other ways. For example, they could be made of concentric cylindrical or frusto-conical stainless steel shells with water flowing in the annular space therebetween. Other cooling fluids, known in the art could be substituted for the water, and certain known non-magnetic alloys could be substituted for the stainless steel However, the illustrated tubing loops provide a simple structure and one suitable for use with a high pressure coolant. Water cooling has several advantages, one of them being that it is comparatively easy to maintain the metal surface temperature low enough to remain within allowable stress limits and to insure the formation of an electrically insulating and protective layer of frozen or solid slag on the inside of the combustion-chamber wall.

The annular nozzle 11 shown in FIGURE 1 is formed between an inner cylindrical wall 35 and the outer frusto-conical wall 24. Both walls are constructed of fluid-cooled tubing 36 in the same manner as the combustion chamber 10. As with the combustion chamber 10, the details of wall construction and the method of cooling may be varied so long as the walls are made of non-magnetic material and are cooled sufficiently to provide a protective layer of solid slag on the inner surface or hot face of the walls.

The center electrode 12 and outer electrode 14 are concentric and generally frusto-conical in shape so as to provide an annular gas-flow passage, defined by the walls forming the space 15, of increasing area in direction of flow. The increasing flow area is desirable because the gas density will decrease as energy is extratced from it, and it will generally be desirable to operate the generator with gas velocity through the inter-electrode space 15 approximately constant. The electrodes 12 and 14 may be constructed of one of several electrically conducting and refractory materials. For example, tungsten, tantalum, graphite, silicon carbide, boron nitride, etc., would be suitable. As will be presently described in greater detail, the electrodes are cooled so as to maintain their gas-side-surface temperatures approximately equal to the softening temperature of the ash in the fuel used.

The diffuser section 13 is partly frusto-conical and partly cylindrical in shape. Making allowance for the volume of the struts 16 which occupy part of the diffuser section volume, the gas flow area through the diffuser should increase in the direction of flow so as to permit deceleration of the gas with the recovery of some of its kinetic energy. As illustrated, the diffuser section 13 is constructed from circular loops of stainless steel tubing 37 joined together so as to form the walls 38 of a pressure-tight gas flow path. Water flow through the tubing 37 is controlled to maintain metal temperatures within acceptable limits and to insure the formation of a frozen layer of electrically insulating and mechanically protecting slag upon the inside surface of the diffuser walls 38. With respect to alternate means for construction and cooling the diffuser, it will be appreciated that the same remarks apply here as applied to the combustion chamber 10, the main restriction upon the construction still being the use of nonmagnetic materials, e.g., austenitic stainless steel, nonferrous alloys, etc.

Figure 2:
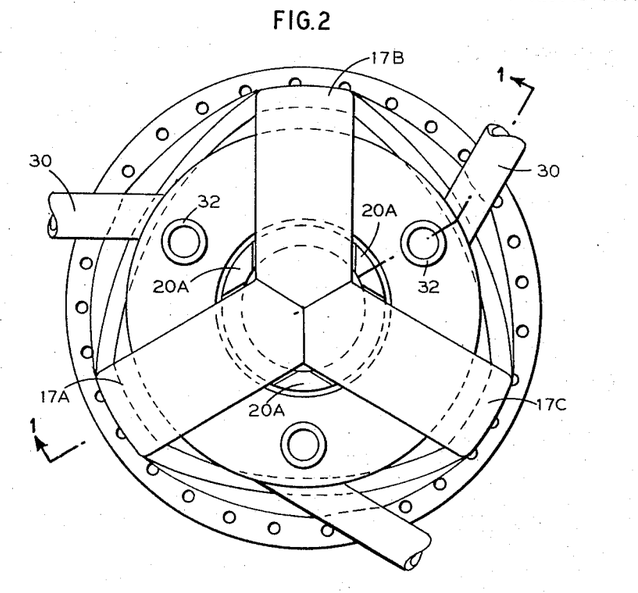
FIG. 2 is a plan view of an MGD generator as in FIG. 1.
Figure 3:
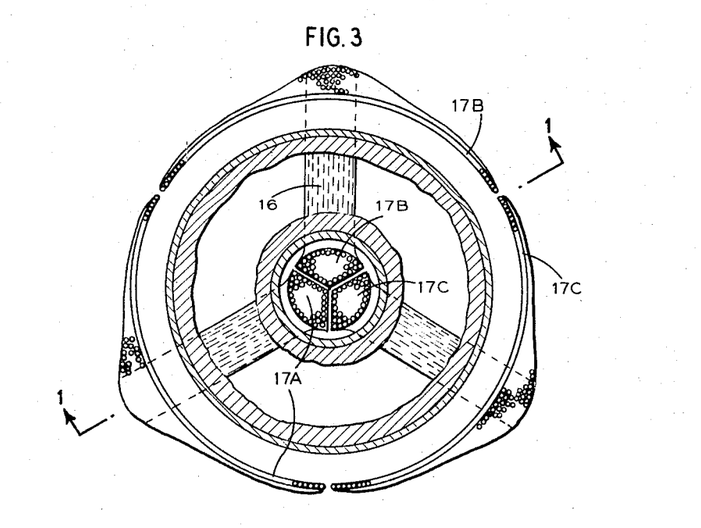
FIG. 3 is a sectional view of the generator taken along the line 3—3 of FIG. 1.

The hollow struts 16 are attached both to the outer walls 38 of the diffuser and to the hollow center electrode wall 20, or an extension thereof. Thus, they support the center electrode 12 and provide conduits communicating with the interior of the center electrode 12 and the outside of the generator 9. As shown in FIGS. 2 and 3, three such struts 16 are employed, although it will be understood that the number could also be 2 or 4, or even more. In cross section, the struts 16 are advantageously elliptical or tear-drop in shape to manimize drag upon the flowing gas. As shown in FIG. 1, the struts 16 are fabricated from loops of austenitic stainless steel tubing 40 joined together so as to form a pressure-tight structure. Water flowing through the tubing maintains the metal temperature within acceptable limits and assures the formation of an electrically insulating and mechanical protective layer of frozen slag on the furnace side of the walls. As with the diffuser 13 and combustion chamber 10, the construction and method of cooling the struts is also susceptible to similar variations.

Each field coil consists of one or more turns of an electrical conductor together with its associated electrical insulation and cooling means. In general, the number of turns in the field coil, or coils, must at least equal the number of struts, although more than one turn may be used in each coil and the number of coils may exceed the number of struts. For purposes of illustration, it is assumed that the electrical conductor is a copper wire, although it will readily be appreciated that the conductor may be made of several other materials that are good electrical conductors, and the shape need not be circular. To illustrate the method of winding, let us start from a point inside the center electrode 12 near its lower end; the wire proceeds around through one of the struts 16 up along the outer electrode 14, past the outside of the nozzle 11, around the combustion chamber 10, into and downwardly through the hollow core 18 of the center electrode support and to the point of origin near the bottom of center electrode. According to one embodiment of this invention, continuation of the wire through several more turns would complete one coil. The ends of the coil terminate in power-supply leads 41 and 42. As shown in FIGURE 3, the field coils consist of three separate coils 17A, 17B and 17C, each made up of several turns of wire. The conductors of each coil are uniformly distributed over the outside of the generator opposite the outer electrode 14, bundled together toward the lower end of the generator 9 so as to pass through the struts 16, and bundled together in passing around the combustion chamber 10. The later bundling permits access of fuel and air pipes 32 and 30, respectively, and fluid cooling connections (not shown), to the combustion chamber and to the electrode supports. The even distribution of the field coil conductors in passing opposite the outer electrode 14 provides a uniform circular magnetic field within the inter-electrode zone 15.

It will usually be advantageous to supply the field coil windings 17 with direct current, in which case the MGD generator output will also be direct current. However, under certain circumstances it may be feasible to energize the field coils with alternating current so that the generator output will also be alternating current. For use with most existing electric power distribution systems, a D.C. output will, of course, have to be converted to A.C. by means of suitable inversion equipment.

The center electrode support or wall 20 is partly cylindrical and partly frusto-conical in shape; the frusto-conical portion contacts and mates with the frusto-conical center electrode 12. The center electrode support wall 20 has three functions: to provide mechanical support and reinforcement for the center electrode; to provide a convenient low resistance electrical connection to the center electrode, and to provide a convenient means for attaching and sealing between the center electrode 12 and the inner wall of the annular nozzle 11, and between the center electrode 12 and the struts 16. The center electrode may be attached to it by one of several convenient means, e.g., by means of a screw thread, by means of bolts, by means of a shrink fit, by welding, etc. The center electrode support may conveniently be made of any of several reasonably strong and reasonably good electrical conductors, e.g., austenitic steel, cooper or copper alloys, graphite, etc. The center electrode support 20 must, however, be compatible with the center electrode material with respect to thermal expansion coefficient, or else it must be separately cooled (not shown) so as to maintain thermal stresses within these two parts within appropriate bounds. As shown in FIG. 2 the upper end of the center electrode support or wall 20 is arranged as at 20A to permit the field coils 17 to pass therethrough. The upper end extension 43 of the center electrode wall 20 constitutes one of two electrical power output leads from the generator. As shown in FIG. 1, this lead may conveniently be grounded as at 44. The center electrode wall 20 forms a convenient means for attaching and pressure sealing the center electrode 12 assembly to the inner wall of the annular nozzle 11 and to the struts 16, or inner wall of the diffuser 12. This attachment may be accomplished in a variety of ways, e.g., by welding, by bolting, etc. It will, of course, be understood that the center electrode wall may also, in some cases, be made merely an extension of the center electrode.

The outer electrode support or wall 21 is frusto-conical in shape so as to mate with the frusto-conical outer electrode 14. It has several functions: to provide additional mechanical strength and support for the outer electrode, to provide a convenient low resistance path for the flow of electric current from the outer electrode to the outside of the generator 9, and to provide means for connecting and sealing the outer electrode assembly to the outer wall of the annular nozzle 11 and to the outer wall 38 of the diffuser 13. It also provides, as shown in FIGURE 1, a convenient member in which to locate insulating gaps 23 and 25. The outer electrode support may be attached to the outer electrode by several means, e.g., by a screw thread, by bolting, by welding, etc. As with the center electrode support, the outer electrode support may be made of any one of a number of materials, provided it has adequate mechanical strength, electrical conductivity, and thermal compatibility with the outer electrode; and, of course, the outer electrode support may be merely an extension of the outer electrode. The outer electrode or wall 21 provides a second electrical power connection 45 to the generator 9. As shown in FIG. 1, this connection may be conveniently made to the "hot lead" of the generator. The outer electrode support forms a mechanical connection and pressure seal to the outer wall of the annular nozzle 11 and to the outer wall of the diffuser 13. As shown in FIG. 1, this connection and the seal are made by means of insulating gaps, so as to also electrically insulate the outer electrode 14 from the rest of the generator 9.

Figure 6:
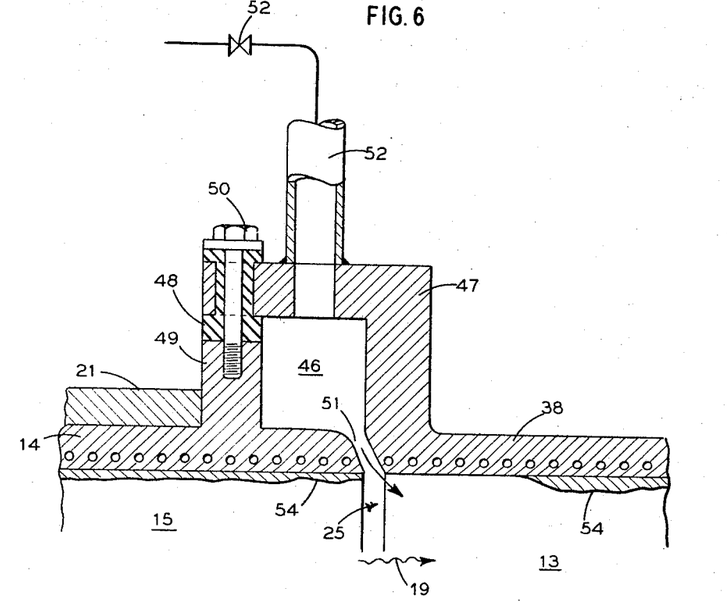
FIG. 6 is an enlarged sectional view through an insulating gap as shown in FIG. 1.

As shown in FIGS. 1 and 6, a simple insulating gap 25 is placed at the lower end of the outer electrode 14, so as to insulate the outer electrode support from the outer wall 38 of the diffuser 13. The construction of this insulating gap will be described in greater detail below. Briefly, as shown in FIG. 6, it consists of an annular plenum chamber 46 formed by an extension 47 of the wall 38 of the diffuser 13. A circular piece or ring 48 of electrical insulating material forms a mechanical connection and pressure seal between the diffuser wall 38 and the outer electrode support or wall 21. The extension of the outer wall of the diffuser may conveniently be secured to an outwardly extending flange 49 on the outer electrode support 21 by means of insulated bolts 50, or by any other means which maintains electrical isolation. A flat circularly elongated nozzle, or slot 51, is formed between the bototm edge of the outer electrode 14 and the diffuser wall 38 comunicating with the diffuser 13. The nozzle or slot 51 forms an acute angle of about 45° with respect to the inner surface of the wall 38, although this angle may range from about 20 degrees to nearly 90 degrees depending upon operating conditions. The plenum chamber 46 is supplied with pressurized fluid through tubes 52 which pass between the field coils 17 on the lower end of the generator 9. The pressurized fluid may advantageously be compressed air, or cooled and compressed combustion gas.

Although, for clarity, I have described a particular shape and method of forming the plenum chamber, it will readily be appreciated that these may be varied considerably according to the shape and nature of the pieces to be insulated, as long as a plenum chamber is formed, the pieces are connected adequately mechanically, the pieces are electrically insulated from one another by insulation placed in a cool region, and means are provided for supplying the plenum chamber with a pressurized nonconducting fluid. On the other hand, the nozzle or slot 51 communicating with the plenum chamber 46, and formed by the edges of the two pieces to be insulated, is an essential and important feature of this invention.

In operation, the insulating gap of FIG. 6 is supplied with pressurized air, or other nonconducting fluid, through a valved pipe 52. The fluid flows out of the plenum chamber 46 through the nozzle 51 dislodging and blowing away slag 54 which might otherwise tend to bridge the gap between the two pieces (14 and 38) to be insulated. The fluid issuing from the nozzle or slot 51 will, be virtue of the high velocity of the MGD generator gas flow, tend to hug the surface of the downstream piece (wall 38) for some distance. This layer of nonconducting fluid against the surface of the wall 38 will tend to further insulate the downstream piece from the upstream piece by eliminating a certain volume of electrically conducting gas which would otherwise be in contact with the wall. The quantity of fluid, e.g. air flow to the plenum chamber, and thence to the slot 51, should be regulated so as to provide the degree of electrical insulation desired, without undue consumption of the insulating fluid or dilution of the working fluid of the MGD generator.

Figure 7:
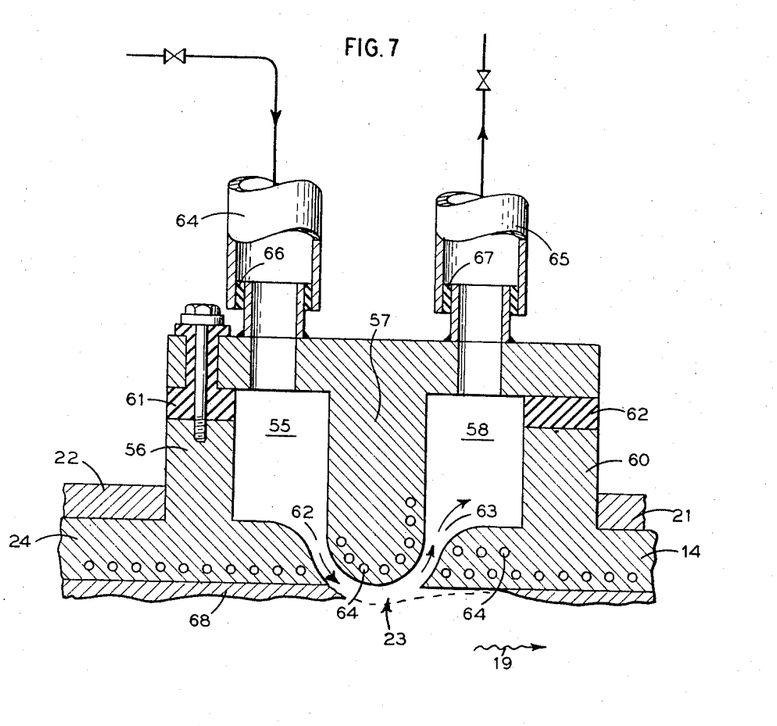
FIG. 7 is an enlarged sectional view through an alternative form of insulating gap shown in FIG. 1.

The insulating gap 23 shown in FIGS. 1 and 7 represents a modification of the insulating gap 25 for the purpose of eliminating excessive blanketing of the downstream wall with nonconducting fluid. As in the arrangement of FIG. 6, the surfaces of the walls to be insulated may be cylindrical, frusto-conical, or flat in shape depending upon the generator in which the gap is to be installed. However, for clarity in illustration, it will again be assumed that this insulating gap is to be installed between pieces of the cylinder.

As shown in FIG. 7, an upstream plenum chamber 55 is formed between a flange 56 positioned on the outside surface of the wall 24, and the surfaces of a cap piece 57, of T-shaped cross-section. The downstream plenum 58 is formed by other surfaces of the cap piece 57 and a flange 60 formed on the outside surface of the wall 14. The cap piece 57 is electrically insulated by members 61 and 62, and bolted to the flanges 56 and 60 of the walls 24 and 14 respectively. As with the insulating gap 25 described in connection with FIG. 6, all electrical insulating material is located away from the high temperature zone of the generator 9, in regions of low or moderate temperature. Thus, there are many common materials which may be used for this insulation. A discharge nozzle or slot 62, extends circularly along the edge of the wall 24, and is formed between the edge of the wall 24 and the cap piece 57. This nozzle communicates with the annular upstream chamber 55 and discharges fluid into the gas flow of the MGD generator. The discharge end of the nozzle is inclined at an angle of approximately 45 degrees with respect to the direction of flow of the working fluid of the generator. The nozzle 63 is formed between the downstream side of the cap piece 57 and the edge of the wall 14, and is inclined at an angle of about 45 degrees in the opposite direction to that of nozzle 62. It communicates with the chamber 58. Additional cooling passages 64 are provided in the leading edge portion of the wall 14, and in the cap piece 57, on the surfaces exposed to heated air bled from the interior of the generator.

As with the insulating gap 25, it will be understood that the plenum chambers 55 and 58 may be constructed in many ways other than that shown in FIG. 7, provided that they are located near the edges of the pieces to be insulated, that adequate mechanical, electrical insulating connection is made between the pieces to be insulated, that provision for fluid-flow entrance to the upstream plenum chamber is provided, that provision for fluid-flow stream exit from the downstream plenum chamber is provided, that the electrical insulating material is located in a zone of low or moderate temperature, and that the plenum chambers communicate with their respective nozzles. As shown in FIG. 7, the cap piece is electrically floating so as to reduce the voltage gradient between the two pieces to be insulated. It will also be understood that this construction is advantageous, but may not be essential in every case, i.e., the cap piece might be electrically connected to one or the other, but not both, of the pieces to be insulated.

The operation of the upstream plenum and upstream nozzle of the insulating gap 23 of FIG. 7 is similar to that for the insulating gap 25 of FIGURE 6. As already stated pressurized air, or other nonconducting fluid, is supplied through the valved pipe 64 to the upstream plenum chamber 55. It discharges through the nozzle 62 into the gas-flow stream of the MGD generator, blowing slag such as shown at 68, from the surface of the upstream wall 24, and to some extent from the surface of the downstream wall 14, also. However, the pressure in the downstream chamber 58 is regulated by means of the valve in pipe 65 so that some of the flow introduced into the MGD generator through the upstream nozzle 62 is withdrawn into the downstream plenum chamber 58 through the downstream nozzle 63. Fluid, e.g. air flow through the pipe 65 is regulated so that the downstream nozzle sucks off most of the air flow introduced into the MGD generator through the upstream nozzle without entraining significant quantities of the gas flowing in the MGD generator. This is possible because, in the short distance between the upstream and downstream nozzles, there will be little opportunity for mixing of the air flow with the generator gas flow. This mode of operation largely prevents blanketing of the downstream wall 14 by cold nonconducting air, which is important in certain cases, for example, when an electrode is immediately downstream of the insulating gap, as is shown in FIG. 1. It will be understood that in most cases the location in an MGD generator where an insulating gap of the type shown in FIG. 7 would be installed would be zones of high pressure so that downstream plenum chamber pressure would ordinarily be above atmospheric pressure, making exhaust pumping unnecessary. However in those cases where this kind of gap is to be installed in a region of low pressure in the MGD generator, it may be necessary to provide an exhaust pump (not shown) following the exhaust valve in pipe 65 so as to maintain the downstream plenum chamber at a sub-atmospheric pressure.

It will be understood that the particular positions chosen for the insulating gaps as illustrated in FIG. 1 are advantageous both from the mechanical and the electrical point of view. However, other locations will be acceptable, even advantageous, under certain circumstances. For example, the upper insulating gap 23 might also be located between the nozzle 11 and the plenum chamber 10. The lower insulating gap 25 might also be located between the lower end of the center electrode 12 and the diffuser 13; or, it might be replaced by three insulating gaps, one each on each of the three struts 16. However, in locating the insulating gaps, due account should be taken of which parts of the generator become electrically "hot," and due care should be taken in selecting the electrode to be grounded and in insulating the "hot" parts against possible shorting or personnel hazard. For example, with the insulating gaps located as shown in FIG. 1, and with the center electrode grounded, only the outer electrode support wall 21 need be of any concern; since it should be insulated to prevent shorting of the field coils. The output power lead 45 should also be insulated to minimize hazard to personnel.

Figure 4:
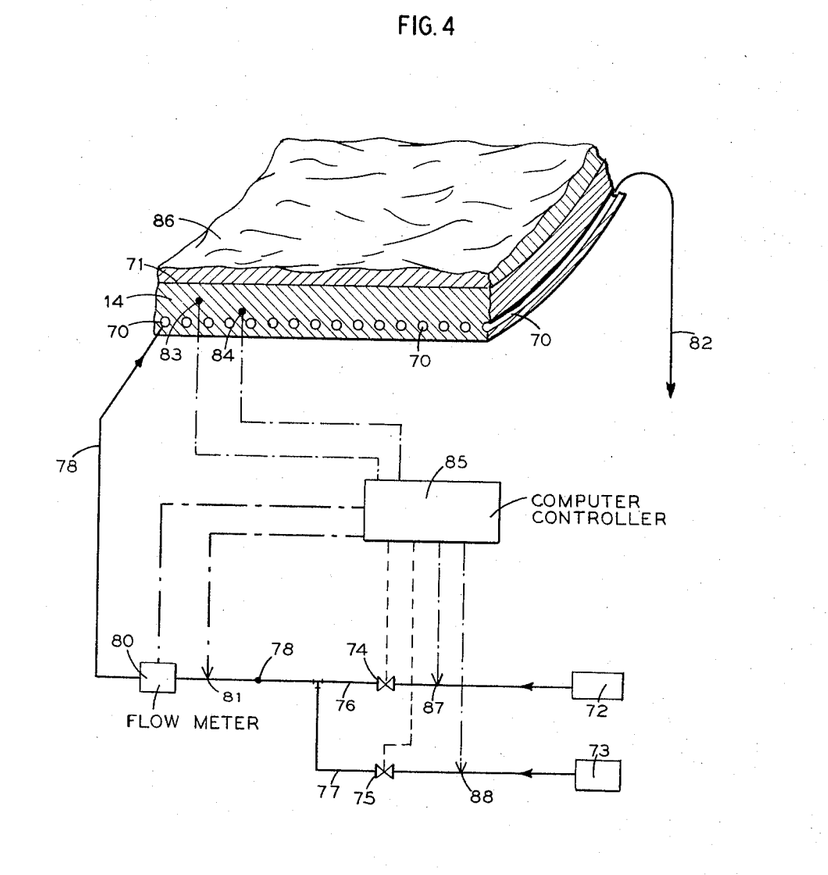
FIG. 4 is an enlarged perspective section of part of a slag covered electrode shown in FIG. 1 and a schematic representation of its associated temperature control.

Now let us turn to a more detailed description of the electrode construction and operation. Shown in FIG. 4 is an isometric section of a portion of the outer electrode 14 of FIG. 1. However, it will be recognized that by merely changing the curvature of this section, it could equally well represent a section of the center electrode 12 of FIG. 1, or a section of an electrode in many other MGD generators. The electrode may be made of any one of several materials having reasonably good, but not necessarily outstanding, electrical conductivity and strengthen up to temperatures equal to the softening temperature of the slag, i.e., up to temperatures of roughly 2500° F. The electrode materials should have some oxidation resistance at these temperatures, but this, too, need not be outstanding, for the electrode is protected against excessive oxidation by a layer of molten or semi-molten slag. For example, tungsten, tantalum, graphite, boron nitride, silicon carbide, and austenitic stainless steels should generally be adequate choice for the electrode material, the final choice depending upon a combination of factors including cost and ease of fabrication. However, it is essential that the electrode material be not ferromagnetic at its operating temperature and under field strengths prevailing in the generator, for this property would lead to short circuiting of the magnetic path with decreased magnetic field strength in the interelectrode zone.

As shown in FIGURE 4, the electrode 14 is cooled by circulation of fluid within channels 70 located within the electrode on the side away from the combustion gas. Since the temperature of electrode hot surface 71 is to be maintained at a value in the vicinity of the slag softening temperature, the thickness of the electrode slab between the cooling passages 70 and the gas-side surface 71 is to be chosen so as to provide a temperature drop equal to the temperature difference between the softening temperature of the slag and the temperature of the cooling medium, less the temperature drop expected between the cooling medium and the wall of the cooling-medium-flow passage. Thus, the thickness of the electrode will depend in a complex fashion upon the heat-flux density incident upon the electrode from the combustion gas, the temperature of the cooling medium, the thermal conductivity of the electrode material, the flow rate of the cooling medium, and the dimensions of the cooling medium flow conduit. Nevertheless, the calculation of the required electrode thickness is quite straight-forward for those skilled in the art of heat transfer, once the nature of the cooling fluid, its temperature, its flow rate, dimensions of the cooling passage, the nature of the electrode material, and the heat flux density incident upon the electrode are decided upon. The last quantity is expected to be of the order of 100,000 B.t.u./hr./sq./ft., but its exact value will depend upon generator operating conditions. To some extent, allowance for uncertainty in this figure can be made through provision for varying the coolant temperature and flow rate. The coolant may be of any one of several fluids, but in general, boiling liquids are to be avoided where possible because of the difficulty of varying their temperature over a sufficiently wide range. Examples of good coolants would include helium, nitrogen, and mixtures of these gases with suspended graphite particles. Other gases such as steam, air, carbon dioxide, carbon monoxide, etc., and their mixtures may be adequate provided that limitations of chemical compatibility or corrosion with the electrode material are observed. As is shown in FIG. 4, in order to permit variation of the coolant temperature, two pressurized coolant sources 72 and 73 are provided, one of high temperature and one of low temperature. The flow rates of these coolants are controllable by valves 74 and 75 positioned in conduits 76 and 77, respectively. Provision is made for combining these two flows in a common conduit 78, for measuring the flow rate of the resulting mix stream by a flow meter 80, and for measuring the temperature of the mixed stream by a temperature sensing element 81. The controlled coolant stream is led to the electrode coolant passages 70 by an extension of conduit 78. Similarly, the spent coolant is withdrawn from the electrode coolant passages by a pipe 82 and returned through appropriate heat exchangers and pumps (not shown) to the coolant sources 72 and 73. It will, of course, be appreciated that other means for regulating the coolant inlet temperature and flow may be used. Temperature measuring devices 83 and 84 are located within the electrode wall 14, the one 83 near the surface of the electrode on the slag side, and the other 84 well back from this surface of the electrode and near the coolant passages 70. These temperature sensing devices may conveniently be thermocouples, but they might also be any other device for providing a remote signal indicative of the electrode temperature, such as thermistors, resistance thermometers, or the like. The purpose of the two sensing elements, and I contemplate one or more sets of them, is to provide an indication of the electrode wall 14 temperature at two points substantially along a line of heat flow. Thus, the two measurement permit computation of the actual temperature of electrode surface 71 by extrapolating a line connecting the two temperatures $T_3$ and $T_4$ obtained by devices 83 and 84 respectively on a graph of electrode surface temperature versus measured distance from the electrode surface 71. It will be appreciated that one of the measuring devices may be omitted provided that the other can be placed sufficiently close to the electrode surface 71 so that its reading is indicative of the electrode surface temperature regardless of variations in the heat flux density through the electrode. As shown in FIG. 4, the output signal from the devices 83 and 84, and the output signals from the flow meter 80 and temperature sensing element 81 are fed into a computer controller 85. This computer controller 85 may be any analog or digital device capable of automatically performing the aforementioned temperature extrapolation, comparing the so-determined electrode surface temperature $T_2$ (at 71) with a preset value, calculating the required coolant temperature and flow required to bring $T_2$ into coincidence with the preset value, capable of calculating the settings of control valves required to bring the coolant flow rate and temperature sensing element 81 into coincidence with the calculated required values, and capable of transmitting to the automatic control valves 74 and 75 appropriate signals for effecting their movement to the calculated positions necessary to produce the desired flow and fluid temperature conditions. Practitioners of the art of automatic control will understand the conditions under which the indications from temperature sensing devices 81, 87 and 88 and the indications from the flow meter 80 may or may not also be required by the computer controller. However, it is not my purpose to go into the details of this control system, for all that is really required in order to practice my invention is some workable and reliable means for controlling the coolant flow rate and bulk fluid temperature so that temperature $T_2$ at electrode surface 71 remains within specified limits at about the softening temperature of the slag layer 86 on the electrode wall 14. It will also be understood that the computer controller 85 may not be necessary in those circumstances where adequate control of the coolant flow and temperature can be obtained by manual means.

The operation of the slag covered electrode described above is as follows. First of all, it is necessary that the MGD generator in which such electrodes are to operate be provided with ash containing fuel; however, if the fuel is too low in ash, this deficiency may be overcome by addition of slag forming materials into the combustion chamber 10. This condition being satisfied, it is next necessary to decide on a temperature in the vicinity of a softening temperature of the slag at which the electrode surface should operate. If not known from experience, practical temperature limits can be ascertained by trial and error; when the temperature $T_2$ is too low, frozen non-conductive slag will form on the electrode, insulating it from the gas flow in the MGD generator and cutting down the generator output; when the temperature $T_2$ is too high, the molten slag layer will become too thin, or nonexistent, and oxidation of the electrode wall 14 will result. Having decided upon the limiting values of the temperature $T_2$, the temperatures determined by devices 83 and 84 are observed and the corresponding value of $T_2$ determined. If the value of $T_2$ is higher than desired, it is lowered by increasing the coolant flow rate and/or by decreasing the coolant temperature as measured by element 81; if $T_2$ is too low, it can be raised by raising the coolant temperature and/or by decreasing the flow rate. The required observations, computations, and adjustments may be carried out manually by observing appropriate indicating instruments, by the use of graphs, and by adjusting valves; or, as is indicated in FIG. 4, they may advantageously be accomplished automatically through the use of a computer controller.

Figure 5:
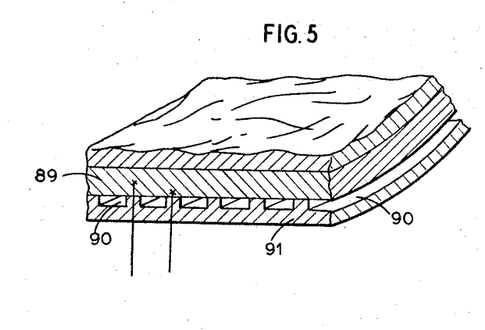
FIG. 5 is an enlarged perspective sectional view of part of an alternative construction of the slag-covered electrode of FIG. 4.

FIG. 5 shows an alternative electrode structure. It accomplishes the same objectives as the electrode of FIG. 4, but construction of the electrode 89 itself is made simpler by including the coolant passages 90 within an electrode support 91, which is brazed, welded, pressed or bolted to the electrode 89. The electrode support 91 may conveniently be made of austenitic steel, copper, copper alloys, aluminum or aluminum alloys, graphite, etc., its main requirements being: good electrical conductivity, thermal compatibility with the electrode 89 material, chemical compatibity with the coolant, and ease of fabrication. As with most other materials of an MGD generator, the electrode support 91 should be made of material other than ferromagnetic material. Coolant connections and control apparauts, and indeed the operation of the electrode of FIG. 5, are substantially identical with the corresponding components and operation of the electrode of FIG. 4, and the circuitry and the control thereof are not shown in FIG. 5.

From the foregoing description, many advantages of the present invention will be apparent. In particular, the present invention provides a practical construction of a MGD generator which circumvents the problems of sidewall and electrode construction when utilizing cheap fossil fuels for producing large quantities of electricity. Thus, the annular generator described herein achieves practical operation without the use of expensive, or even presently nonexistent, materials of construction in the electrodes and other enclosing walls. Another advantage of the present invention is that it provides practical electrodes for use in either annular, or nonannular, MGD generators. These electrodes achieve long service life notwithstanding the hight temperature oxidizing conditions normally to be found in the working fluid of a MGD generator utilizing combustion gas as a working fluid. Another advantage of the present invention as shown in FIG. 1 is that it provides gaps for electrically insulating various parts of a MGD generator, and even generators which are other than annular, in spite of the electrically conducting layer of molten slag that will normally be found on the interior walls of any MGD generator utilizing ash containing fossil fuels such as coal or residual fuel oil. These insulating gaps may also be used to advantage in MGD generators with nonslagging walls to overcome similar insulating problems arising from the tendency of even normally insulating materials to become conductive at very high temperatures and from the need to insulate certain walls from the working fluid.

In operation, pressurized and preheated air, oxygen, or a mixture thereof is fed into the plenum or combustion chamber 10 through pipes 30, pressurized ash-containing fuel together with seeding material is fed into the combustion chamber through pipes 32. The resulting combustion, which may be initiated by any suitable means, as for example an electric spark will be self-sustaining and will produce high temperature, high pressure electrically conducting combustion gas. Depending upon the fuels and oxidant used, the actual temperature of the combustion gas would typically fall in the range of 4000° F. to 6000° F. Depending upon the power cycle into which the generator is to be incorporated, the pressure of the combustion gas would range from about 30 p.s.i.a. to about 300 p.s.i.a. Depending upon the temperature and the amount of seeding material present, the electrical conductivity of the combustion gas will range from about 20 mhos/m. to about 200 mhos/m. On account of the extremely high working temperature, in addition to the normal gaseous products of combustion, the combustion gas will also contain vaporous and molten ash or noncombustible constituents. From the combustion chamber 10, the combustion gas expands through the annular nozzle 11, dropping somewhat in temperature and pressure and achieving a high velocity in a substantially axial direction. Because of the comparatively low temperatures of the walls of the combustion chamber and nozzle, since they are fluid cooled, the ash or ash constituents will be retained in frozen or solid form to provide a protective covering of solidified slag which will limit heat transfer to the wall cooling coils to tolerable rates and also protect these parts from excessive erosion. The combustion gas continues through the inter-electrode zone 15, dropping in temperature and pressure, and increasing in specific volume, as it goes. By virtue of the axial flow of the ionized gas with respect to the circular magnetic field, an electric current will be generated and caused to flow between the center electrode 12 and the outer electrode 14. It will be transmitted through the electrodes, thence through the electrode supporting walls 20 and 21 to the exterior of the generator and to point of use. By carefully controlling the temperature and flow rate of electrode coolant, the surface temperatures of the center and outer electrodes are regulated to values approximating the slag softening temperature. Thus, the electrodes collect a layer of molten or semi-molten slag which protects them from excessive erosion and oxidation, but does not seriously interfere with the flow of electricity. By virtue of the interaction of current flow and magnetic field and wall cooling of the fluid flow path, the combustion gas undergoes a decrease in temperature and pressure as it progresses through the inter-electrode zone, but with increasing annular flow area, its velocity remains substantially constant. Upon leaving the inter-electrode zone 15, the gas enters a diffuser section, where its temperature and pressure increase somewhat and its velocity decreases by virtue of the increasing flow area. From the diffuser, the gas may be discharged to other equipment for further extraction of the heat energy which it still contains. The substantially circular magnetic field within the inter-electrode zone is produced by current flow through the field coils 17. This current may conveniently be supplied by either series or shunt connection, not shown, with the generator electrodes or electrode supports, or it may be supplied from an entirely external source. In any event, power requirement of the field coils will be small in comparison with the power available from the generator electrodes. Although the cooling medium within the walls of the combustor, nozzle, diffuser, and struts will produce a layer of frozen slag on these surfaces, the slag will continue to build up to an equilibrium thickness such that the slag surface removed from the cooling agent will be molten. This layer of molten slag will normally extend and be continuous from the combustion chamber along the inner wall of the annular nozzle, a long the center electrode, along the struts to the outer wall of the diffuser. If the center electrode is grounded, as is shown in FIG. 1, this layer of molten slag presents no particular difficulty or hazard. However, if the outer electrode is not to be short circuited, the layer of molten slag must be broken above and below the outer electrode, and this function is achieved by the insulating gaps 23 and 25.

It will be recognized, of course, that in describing the construction and operation of this generator, I have assumed it to utilize an ash containing fossil fuel, such as coal or oil, and I have assumed the ash to be present in sufficient quantity to provide the protective slag coatings described. In cases where the fuel is deficient in ash, as for example natural gas, I contemplate adding sufficient ash to the combustion chamber to achieve proper slag coating notwithstanding the fuel's deficiency in this respect.

In the foregoing description of the generator and its operation, it has been assumed that the manner of injecting gas into the toroidal plenum chamber 10, or the manner of injecting air into the toroidal combustion chamber 10, would be such as to produce substantially axial flow through the annular nozzle 11. It will be understood that if the gas-flow-velocity vector just upstream of the nozzle 11 contains a circular component, the gas flow issuing from the nozzle will still contain approximately the same circular component, making the gas flow vector entering the inter-electrode zone 15 helical. Whether or not a purely circular magnetic field is suitable for use with such a inlet-gas flow depends upon the relative magnitudes of the circular and axial components in the helical flow, and upon how much of the circular component one is willing to let go to waste. The circular component of the helical velocity represents translational energy which has been put into the gas at the expense of thermal energy; this energy cannot be recovered in passing through a purely circular field. In many cases, the circular component will be small in comparison with the axial component, and the amount of energy which it represents will be even smaller in comparison with the amount of energy to be extracted from the gas in the MGD generator. In these cases, the circular component of gas flow may, if desired, be ignored, the gas flow being considered to be substantially axial even though it contains a circular component, i.e., even though the gas flow through the generator is more aptly described as "long pitch helical" rather than purely axial. In other cases, the gas flow leaving the annular nozzle may have a circular component which is large in comparison with the axial component, so that recovery of the energy associated with the circular component may be desirable. In any case, however, recovery of the kinetic energy of the circular flow component is a relatively simple matter involving only the addition of an axial magnetic field component to the circular magnetic field produced by the toroidal field-coil windings; the result is a helical magnetic field of relatively short pitch.

Figure 1A:
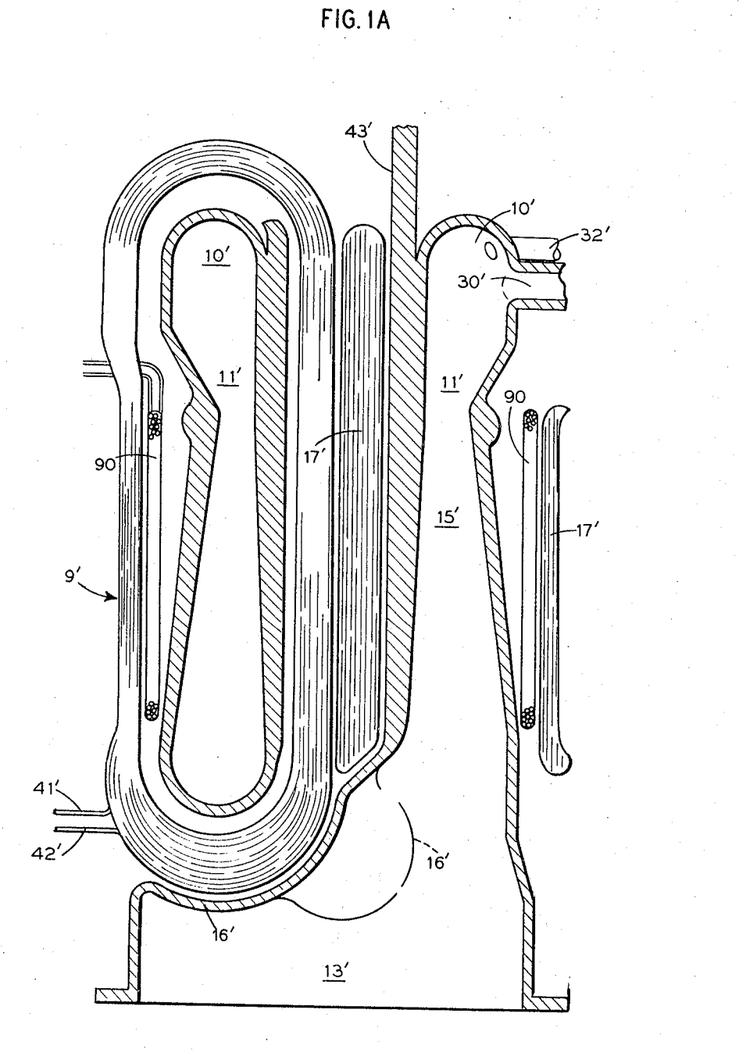
FIG. 1A is a simplified sectional view of a modified MGD generator.

For purpose of illustrating the construction and use of a helical magnetic field, as in FIG. 1A, it will be assumed that the circular component of gas flow arises from use of a cyclone combustion chamber 10', which has many well-known advantages for burning coal or oil. The generator, shown in cross-section in FIG. 1A is identical in every respect with the generator of FIGS. 1, 2, and 3 except that the combustion chamber 10' is provided with tangential air and fuel inlets so as to produce cyclonic flow, and a circular field coil 90 has been added within the toroidal field coils 17. The circular field coil, is composed of substantially circular turns, each of the turns being in a plane substantially perpendicular to the axis of the generator 9', and the center of the turn coinciding with the generator axis. The turns of the circular field coil should be uniformly distributed along the length of the generator opposite the inter-electrode zone 15' so as to produce axial components of magnetic flux. With this configuration, the axial field produced by the circular field coils 90 combines with the circular field produced by the field coils 17' to produce the helical magnetic field within the inter-electrode zone. By properly selecting the directions and relative magnitudes of the current flows in the circular and toroidal field coils, it is possible to adjust the pitch of the magnetic flux helix so that the magnetic flux vector is just perpendicular to the gas flow vector at the exit of the nozzles 11'. The directions, but not necessarily the magnitudes, of the magnetic flux should be preserved in actual operation.

The operation of the generator of FIG. 1A is identical with the operation of the generator in FIG. 1, except in the following respects: the helical gas flow produced by the cyclone combustor 10' is accelerated in both the axial and circular directions in passing through the nozzle. Consequentially, the combustion gas leaves the nozzle 11 with a significant circular component of velocity. The current flow to the circular field coil 90 is adjusted so as to just remove this circular component of velocity by the time the gas has traversed the inter-electrode zone 15'. This permits all of the kinetic energy of the gas associated with the circular velocity component to be recovered by the time the gas enters the diffuser 13 and the gas flow is then generally axial.

Although I have described the generator of FIG. 1A with specific reference to a cyclone combustion chamber 10', it will readily be understood that this combustor might be replaced by a toroidal plenum chamber having tangential gas inlets. Moreover, under certain circumstances it will be advantageous to purposely design the plenum chamber, or combustion chamber, so as to attain the highest possible circular component of gas velocity. This permits, for a given magnetic field strength within the inter-electrode zone, relatively more of the field-coil conductors to be used in circular rather than toroidal field coils, with savings in construction costs. It will further be understood that the helical magnetic field may be achieved in other ways than that shown in FIG. 1A. For example, it can be achieved by "warping" the toroidal field coils; this can best be visualized by assuming that one firmly grasps the top and bottom loops of the toroidal field coil winds in either hand, and then rotates one hand with respect to the other. Warped field coils have, however, the disadvantage of not permitting adjustment during operation of the pitch of the magnetic flux helix.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for generating electric power comprising walls forming concentric frusto-conical electrodes defining a circumferentially unobstructed annular gas-flow passage therebetween, said gas-flow passage increasing in flow area in the direction of gas flow therethrough, means for passing a high velocity flow of electrically conducting gas through said annular gas-flow passageway to produce axial and circumferential flow including walls defining inlet and outlet means, means for producing a magnetic field within said annular gas-flow passage substantially perpendicular to the direction of gas-flow through said annular gas-flow passage, means for electrically separating said electrodes from said walls defining the said inlet and outlet means, means for collecting generated electric power from said electrodes.

2. Apparatus for generating electric power comprising fluid cooled walls forming concentric frusto-conical electrodes defining an annular gas-flow passage therebetween, said gas-flow passage increasing in flow area in the direction of gas-flow therethrough, fluid cooled walls defining a furnace of circular cross-section coaxial with the axis of said electrodes for producing a high pressure ionized gas therein by the combustion of an ash-containing fuel therein, fluid cooled walls defining a nozzle for passing said ionized gas from said furnace into said gas-flow passageway at a high velocity, means for producing a magnetic field within said annular gas-flow passage generally normal to the direction of gas-flow therethrough, means for collecting generated electric power from said electrodes, and means for electrically insulating portions of said electrodes from other portions of said electrode walls including a gap between electrode walls, and means for injecting an insulating jet through said gap into the flow passage of said ionized gas.

3. Apparatus for generating electric power comprising walls forming concentric frusto-conical electrodes defining an annular gas-flow passage therebetween, said gas-flow passage increasing in flow area in the direction of gas flow therethrough, means for passing a high velocity flow of electrically conducting gas through said annular gas-flow passageway, the velocity vector of said gas-flow direction being substantially axial with respect to the common axis of said frusto-conical electrodes, means for producing a circular magnetic field within said annular gas-flow passage including an electro-magnetic conductor extending through the core of the inner frusto-conical electrode, walls defining a strut positioned adjacent the discharge end of said annular gas-flow passage and connecting said concentric frusto-conical electrodes, said electro-magnetic conductor extending through said strut and around the exterior of the outermost of said electrodes to said core, and means for collecting generated electric power from said electrodes.

4. An electrode for use in an MGD generator comprising an electrode body having a melting point exceeding the softening point of non-combustible slag entrained in the MGD working fluid flow, said electrode being mechanically supported and electrically contacted by a non-magnetic metallic electrode support, means for cooling the electrode so as to maintain the temperature of the surface of the said electrode adjacent the MGD gas flow to a value in the vicinity of the softening temperature of said slag, said cooling means including coolant flow passages within the electrode, a source of coolant fluid of controllable temperature and flow rate, means for measuring the temperature of the electrode at spaced points within the electrode, said temperature measuring means being positioned at different depths within the electrode relative to the surface of the electrode adjacent the MGD gas, and means responsive to the temperatures of said electrode for regulating the flow of coolant through said electrode flow passages.

5. Apparatus for electrically insulating two parts of an MGD generator comprising walls defining an upstream plenum chamber formed between the upstream portion of one said parts to be insulated and a cap piece, said upstream portion and said cap piece being mechanically connected but electrically insulated from each other, means defining an upstream nozzle formed between the edge of said upstream portion and said cap piece and communicating with said upstream plenum chamber, means defining a downstream nozzle formed between said cap piece and the downstream portion of the other of said parts to be insulated, walls defining a downstream plenum chamber formed between the edge of said downstream portion and said cap piece, said cap piece being mechanically connected but electrically insulated from said downstream portion, means for passing a jet of electrically insulating fluid through said upstream nozzle, and means for withdrawing a portion of said fluid through said downstream nozzle into said downstream plenum chamber.

6. A method for electrically insulating adjacent wall portions of an MGD generator utilizing an ionized gas stream containing entrained non-combustible liquids and vapors as a working fluid which comprises, injecting a sheet of electrically non-conductive fluid into said generator between said adjacent wall portions to sever the layer of such non-combustibles tending to form on the surface of said wall portions, and withdrawing a major portion of such injected non-conductive fluid from said ionized gas downstream in an ionized gas flow sense of said sheet.

7. Apparatus for generating electric power according to claim 1, wherein said electrically conducting gas passed through said gas-flow passage is produced by combustion of fuel and said gases contain suspended non-combustibles in vapor and liquid form.

References Cited by the Examiner
UNITED STATES PATENTS

| | | |
|---|---|---|
| 1,196,511 | 8/1916 | Borger. |
| 3,120,621 | 2/1964 | Gunther ___________ 310—11 X |
| 3,151,259 | 9/1964 | Gloersen ___________ 310—11 |
| 3,155,850 | 11/1964 | Meyer ___________ 310—11 |
| 3,189,768 | 6/1965 | Brill ___________ 310—11 |
| 3,214,614 | 10/1965 | Maeder ___________ 310—11 |
| 3,215,871 | 11/1965 | Brill ___________ 310—11 |

MILTON O. HIRSHFIELD, *Primary Examiner.*

DAVID X. SLINEY, *Examiner.*